March 5, 1957 W. K. BOOTH 2,783,545
METHOD OF COOLING AND CONDITIONING BREAD
Filed June 1, 1951
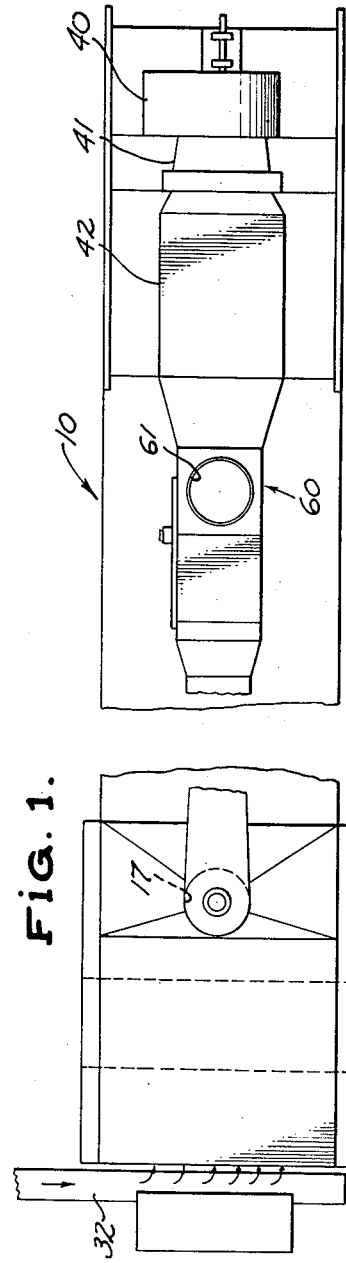
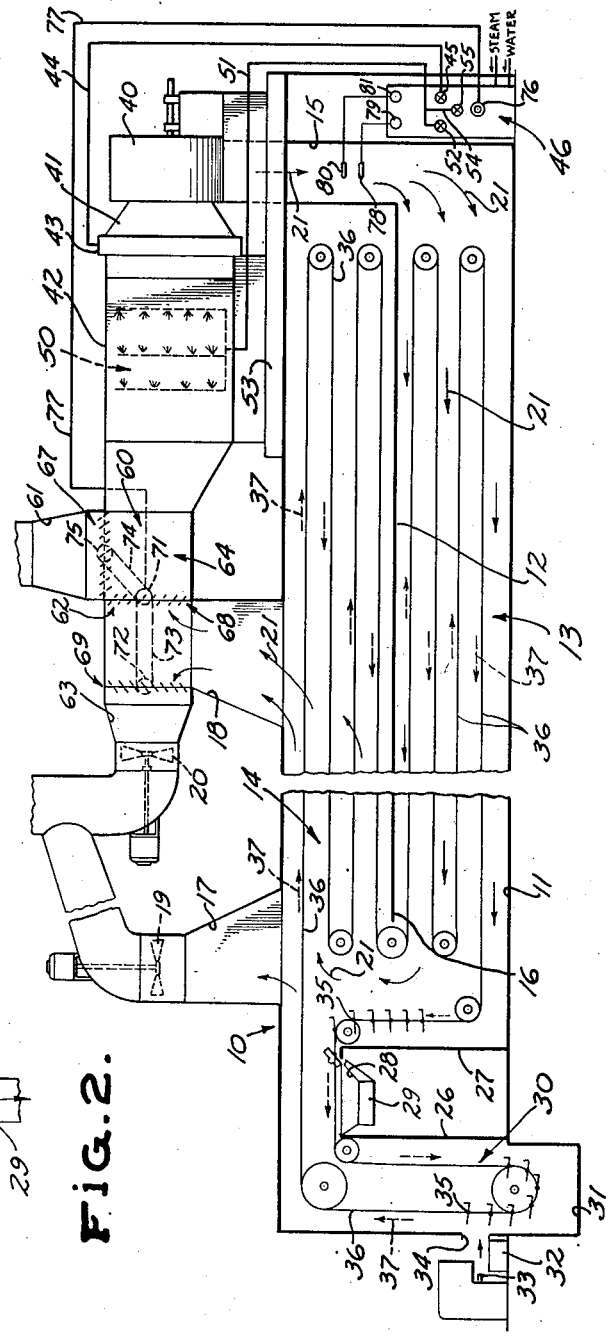
FIG. 1.
FIG. 2.
INVENTOR.
WILLIAM K. BOOTH
BY HIS ATTORNEYS
HARRIS, KIECH, FOSTER & HARRIS ' # United States Patent Office 2,783,545
Patented Mar. 5, 1957

2,783,545

METHOD OF COOLING AND CONDITIONING BREAD

William K. Booth, Pasadena, Calif., assignor, by mesne assignments, to Capitol Products Corporation, Mechanicsburg, Pa., a corporation of Pennsylvania Application June 1, 1951, Serial No. 229,410

2 Claims. (Cl. 34—20)

The present invention relates in general to a method of and apparatus for cooling bakery products after baking and, more particularly, to a method of and apparatus for cooling loaves of bread.

After loaves of bread have been baked, they are removed from the baking pans and cooled before being processed further, cooling of the loaves being essential for at least two reasons. First, when the loaves of bread are removed from the baking pans, they have insufficient structural strength to withstand the forces applied thereto by slicing and/or wrapping machines, for example, and tend to collapse in such machines. Consequently, it is necessary to cool the loaves sufficiently to provide them with the structural strength required to withstand such further processing as slicing and/or wrapping. Secondly, it is necessary to cool the loaves for a period of time sufficient to permit excess moisture to evaporate therefrom, such moisture being exuded by the loaves during cooling. Otherwise, such moisture would condense on the inner surfaces of the wrapping paper and would ultimately be absorbed by the loaves to render them soggy. The customary practice is to cool the loaves to an internal temperature of the order of magnitude of 90° F. to 110° F. before processing the loaves further, although it will be understood that the present invention is not limited to this particular range of temperatures.

In large bakeries employing travelling ovens, the loaves of bread are removed from the baking pans as the latter arrive at the discharge end of the oven and are placed on shelves or trays which are continuously conveyed through a cooling chamber, the trays ordinarily being pivotally suspended from conveyor chains, or the like, so that the loaves of bread may be dumped from the trays after cooling by rotating or tilting the trays into dumping positions. In order to cool the loaves in a reasonable length of time, it is conventional to circulate cooling air through the cooling chamber, a cooling time of approximately one and one-half hours being more or less standard. In other words, a period of about one and one-half hours is required for each cooling tray to pass through the cooling chamber.

In the past, in order to reduce the cooling time to a reasonable value, it was necessary to refrigerate the cooling air under conditions of high atmospheric temperatures, particularly where the atmospheric humidity was also high. More particularly, refrigeration of the cooling air has been regarded as essential whenever the atmospheric relative humidity approaches 70% with an atmospheric temperature of 70° F., or more. As is well known in the art, refrigeration systems for bread cooling installations are expensive, both as regards initial costs and operating costs, because of the relatively large volumes of air that they must handle.

In view of the foregoing, an important object of the invention is to provide a bread cooling method and apparatus which avoids many of the disadvantages of prior practice by eliminating any necessity for refrigerating the cooling air, at least in most areas of the world.

I accomplish the foregoing by evaporative cooling of the loaves of bread with air of high temperature and humidity flowing over or past the loaves at a high velocity. More particularly, I accomplish the foregoing by employing cooling air having a dry bulb temperature of from about 5° F. to about 20° F. less than the final internal bread temperature and having a relative humidity of at least 70%, and by flowing the cooling air of such temperature and humidity over or past the loaves of bread at a velocity of at least 150 feet per minute. Preferably, the dry bulb temperature of the cooling air is between approximately 5° F. and 10° F. below the final internal bread temperature, and the velocity of the cooling air is approximately 250 feet per minute. The relative humidity of the cooling air is preferably around 85% to 90% and may approach 100%.

An important feature of the present invention is that it cools the bread to a specified internal temperature in a period of time of less than the one and one-half hour period discussed previously, and results in loaves of bread having crusts of excellent quality, i. e., tender and neither too dry nor too moist. More particularly, the quality of the cooled product is at least equal to, and in many instances superior to, that of bread cooled in refrigerated installations used heretofore, such excellent results being obtained under temperature and humidity conditions for the cooling air which have heretofore been regarded as entirely too hot and humid, by flowing the air past the loaves of bread at a high velocity.

An important advantage of the present invention is that the foregoing conditions of temperature and humidity for the cooling air may be attained readily with equipment which may be installed and operated very economically as compared to refrigeration systems. For example, in the southwestern section of the continental United States where the air is normally hot and dry during the summer, the foregoing temperature and humidity conditions for the cooling air may be attained readily merely by humidifying the air by a spraying process, or otherwise. For example, in Phoenix, Arizona, tests of an installation embodying the invention were conducted with an outside air temperature of 116° F. and of very low relative humidity. The air was humidified to an extent sufficient to increase its relative humidity to around 85% to 90%, the humidifying process resulting in evaporative cooling of the air to a dry bulb temperature of around 85° F. to 90° F. Loaves of bread were cooled to an internal temperature of approximately 95° F. with air of such dry bulb temperature and relative humidity in about one and one-quarter hours by circulating the air past the loaves of bread at a velocity of about 240 feet per minute, i. e., at a velocity substantially equal to the preferred velocity discussed previously.

The crusts of the loaves after cooling under such conditions were tender and of excellent quality.

As will be apparent, similar conditions of temperature and humidity for the cooling air may readily be obtained in other areas. For example, the atmospheric temperatures and relative humidities in various parts of the continental United States, such as in the eastern and middlewestern sections thereof, are frequently within the desired ranges during the summer. During other seasons of the year, and in colder locations, the desired temperatures and relative humidities may be obtained readily merely by humidifying and heating the air as required. Similarly, the desired temperatures and humidities may be obtained in substantially all areas of the world merely by heating and/or humidifying the air and without the use of refrigeration, other than the refrigeration secured by evaporative cooling of the air, which requires no expensive equipment.

Thus, by employing cooling air of high temperature and humidity, which conditions are readily attainable, and by circulating the air past the loaves of bread at a high velocity to compensate for the high temperature and humidity of the cooling air, the present invention permits evaporative cooling loaves of bread and with inexpensive and economically operated equipment, which is an important feature. It will be understood that the cooling air velocity must be sufficiently high to enable the relatively hot air to cool the loaves of bread in a reasonable length of time and must be sufficiently high to avoid complete saturation of the air by the moisture evaporated from the loaves of bread. In other words, the velocity of the air must be sufficiently high to prevent the air temperature from attaining the temperature of the bread, and to prevent the relative humidity from attaining 100%. I have found that the velocity of the air must be at least 150 feet per minute and, preferably, of the approximate order of magnitude of 250 feet per minute. The air velocity may be increased considerably above the latter value, although, as a practical matter, the air velocity should not exceed 500 feet per minute.

As will be discussed in more detail hereinafter, the foregoing values of cooling air velocity are based on the volumetric rate of flow of air through the cooling chamber in cubic feet per minute divided by the cross-sectional area of the cooling chamber, without making any allowance for the effects of and the area reductions offered by the obstructions in the cooling chamber, such as the cooling trays, the loaves of bread carried thereby, and the like. Consequently, the actual mean velocity of the air, taking into account the effect of obstructions in the cooling chamber, would be somewhat higher than the values discussed previously, and would be subject to local variations because of the effects of the obstructions. Consequently, it must be understood that the values for cooling air velocity used herein are, as hereinbefore indicated, based on the volumetric flow rate divided by the cross-sectional area of the stream of cooling air.

An important object of the present invention is to provide a method and apparatus wherein the general flow of loaves of bread through the cooling chamber is in a direction opposite to the direction of flow of the cooling air therethrough so that the loaves are exposed to progressively cooler cooling air as they are cooled. In other words, the incoming bread is exposed to cooling air whose temperature has been increased by heat extracted from previously cooled loaves, and then is exposed to progressively cooler air as the temperature thereof decreases.

I prefer to accomplish the foregoing by dividing the cooling chamber into two cooling zones, the cooling air being delivered to the first cooling zone and flowing therethrough into the second cooling zone by way of interconnecting passage, the loaves of bread being cooled being conveyed in the opposite direction, i. e., being delivered to the second cooling zone mentioned and then being conveyed into the first cooling zone.

Another object is to provide a generally horizontal cooling chamber which is divided into the aforementioned cooling zones by a generally horizontal baffle or partition extending substantially the entire length of the cooling chamber, the baffle being spaced from one end of the cooling chamber to provide an interconnecting passage between the two cooling zones and to provide a passage through which the trays of bread may be conveyed from the second cooling zone into the first. Preferably, the first cooling zone into which the cooling air is introduced initially is below this baffle, the second cooling zone into which the loaves of bread are introduced initially being above the baffle. The cooling conveyor carrying the trays of bread preferably is provided with a plurality of generally horizontal runs some of which are above the baffle or partition and the rest of which are located therebelow. Preferably, the baffle is located at a level above the bottom of the cooling chamber equal to approximately one-half to three-quarters of the height of the cooling chamber so that the volume of the lower cooling may range from a value approximately equal to that of the upper cooling zone to a value of approximately three times that of the upper cooling zone.

Another important object of the invention is to provide proportioning means for mixing, in a mixing chamber, exhaust air taken from the upper cooling zone with fresh air taken from an outside source, the resulting mixture subsequently being humidified and/or heated to bring its temperature and humidity to the desired values before introducing it into the lower cooling zone. Another object is to provide such a proportioning means capable of varying the proportions of the exhaust air and the fresh air entering the mixing zone between 0 and 100%. In other words, only fresh air can be delivered to the lower zone of the cooling chamber by the proportioning means, or only air exhausted from the upper zone of the cooling chamber may be delivered to the lower zone by recirculation, or any desired proportions of the two may be employed. For example, when operating at night, or at any time when the outside air temperature is low, it is desirable to employ a partially or completely closed system to avoid having to heat the cooling air excessively. The proportioning means permits operating the installation as a partially or completely closed system in this manner, which is an important feature.

Another object is to provide a control system which controls the proportioning of fresh air with exhaust air, the humidification of the resulting mixture and the heating of the resulting mixture to provide the cooling air delivered to the lower zone of the cooling chamber with the desired relative humidity and dry bulb temperature. Another object is to provide means for heating the water used to humidify the cooling air when the cooling water temperature is low, or when the temperature of the air delivered to the humidifying zone is particularly low.

The foregoing objects and advantages of the present invention, together with various other objects and advantages thereof which will become apparent, may be attained with the exemplary embodiment of the invention which is illustrated in the accompanying drawing, and which is described in detail hereinafter. Referring to the drawing:

Fig. 1 is a diagrammatic plan view of one embodiment of an apparatus of the invention which is capable of performing the method of the invention; and Fig. 2 is a diagrammatic side elevation of such apparatus, the interior of the apparatus being exposed to view.

Referring to the drawing, the bread cooling apparatus illustrated therein includes an elongated cooling chamber 10 which is disposed horizontally on a floor 11, or the like. A horizontal partition or baffle 12 extends laterally across the interior of the cooling chamber 10 and extends longitudinally thereof to divide the cooling chamber into a first, lower cooling zone 13 and a second, upper cooling zone 14. Cooling air is introduced into the lower zone 13 of the cooling chamber 10 through an inlet 15 at one end of the lower cooling zone and flows substantially horizontally through the lower cooling zone to a passage 16 at the other end thereof which connects the upper cooling zone 14 to the lower cooling zone. From the upper cooling zone 14, the cooling air is discharged through one or the other, or both, of two outlets 17 and 18 having exhaust fans 19 and 20 therein, respectively. The baffle 12 completely separates the upper cooling zone 14 from the lower cooling zone 13, except for the interconnecting passage 16, the flow of cooling air through the two cooling zones being as indicated by the solid-line arrows 21, assuming that both exhaust fans 19 and 20 are in operation.

The cooling chamber 10 is provided with two horizontally spaced, vertical walls 26 and 27 which extend horizontally across the cooling chamber and which extend vertically from the bottom of the cooling chamber substantially to the top thereof, the wall 27 cooperating with one end of the horizontal baffle 12 to provide the passage 16 interconnecting the upper and lower cooling zones. The walls 26 and 27 are connected along their upper edges by walls forming a discharge chute 28 for cooled loaves of bread, this discharge chute leading to a discharge conveyor 29 extending crosswise of the cooling chamber 10. The wall 26 cooperates with the adjacent end wall of the cooling chamber 10 to provide a loading chamber 30 for loaves of bread to be cooled, this loading chamber extending downward into a pit 31 in the floor 11 in the particular construction illustrated. The loaves of bread to be cooled are delivered to the cooling chamber 10 by a loading conveyor 32 which extends crosswise of the cooling chamber 10, a pusher or ram 33 being provided to feed the loaves of bread from the loading conveyor 32 into the loading chamber 30 through an opening 34 in the corresponding end wall of the cooling chamber.

The loaves are pushed through the loading opening 34 by the ram 33 onto trays or shelves 35 on a cooling conveyor 36 which operates in timed relation with the ram. Each tray 35 is adapted to receive a plurality of loaves of bread and is preferably pivotally suspended from the cooling conveyor 36, which may comprise a pair of spaced, parallel chains, for convenience in dumping the loaves of bread from the trays after cooling, as will be discussed in more detail hereinafter. The cooling conveyor 36 is trained around rotatable elements, such as sprockets, which guide the cooling conveyor and the trays carried thereby through the cooling chamber 10 and which provide a plurality of horizontal runs in the lower and upper cooling zones 13 and 14, the direction of movement of the cooling conveyor being indicated by the broken-line arrows 37. Preferably, the horizontal baffle 12 is so disposed between two of the runs of the cooling conveyor 36 that there are several runs above and below the baffle. Preferably, the elevation of the baffle 12 above the bottom of the cooling chamber 10 is equal to from about one-half to three-quarters of the height of the cooling chamber so that the volume of the lower cooling zone 13 ranges from a value about equal to that of the upper cooling zone to a value approximately three times that of the upper cooling zone. As will be noted, the cooling conveyor 36 moves from the upper cooling zone 14 into the lower cooling zone 13 through the interconnecting passage 16. After a given tray 35 on the cooling conveyor 36 has passed all the way through the upper and lower cooling zones 14 and 13, it is conveyed upwardly over the discharge chute 28 and, at this point, it is rotated into a tilted position so that the loaves of bread slide therefrom into the discharge chute and downwardly onto the discharge conveyor 29, which conveys them to slicing and/or wrapping machines, or the like.

As will be noted, the cooling air first enters the lower cooling zone 13 and flows therethrough into the upper cooling zone 14, from which it flows out of the cooling chamber 10 through either or both of the outlets 17 and 18. Conversely, general movement of the loaves of bread being cooled is from the upper cooling zone 14 to the lower cooling zone 13 so that, in general, there is countercurrent movement of the bread and the cooling air. In other words, initially, the hot bread is exposed to cooling air which has been heated by loaves introduced earlier, and, as the loaves of bread cool, they are exposed to progressively cooler air in the lower cooling zone 13. Such countercurrent flow of the cooling air and the loaves of bread being cooled results in more effective utilization of the cooling air, which is an important feature. Also, the employement of the baffle 12 for separating the two cooling zones confines the cooling air to a well defined stream so that all of the air entering the cooling chamber through the inlet 15 is forced to flow at a high velocity over the loaves of bread being conveyed through the lower cooling zone, which is an important feature. Thus, with the cooling chamber 10 illustrated, close control of the cooling air velocity may be attained as compared to an installation wherein the air is introduced into and exhausted from a cooling chamber more or less indiscriminately so that large dead areas exist. As will be apparent, substantially uniform flow of the cooling air exists throughout the entire lower cooling zone 13.

Considering the manner in which the cooling air is conditioned and delivered to the inlet 15 of the cooling chamber 10, the inlet 15 communicates with the outlet of a blower 40. The capacity of the blower 40 is so related to the cross-sectional area of the lower cooling zone 13 that the desired velocity of the cooling air through the lower cooling zone is obtained. As previously indicated, the values set forth for the velocity of the cooling air are based on the volumetric rate of flow through the lower cooling zone 13 divided by the cross-sectional area of the lower cooling zone without any allowance for such obstructions in the lower cooling zone as the cooling conveyor 36, the trays 35, the loaves of bread on the trays, and the like. In other words, the air velocity values hereinbefore recited merely represent the output of the blower 40 divided by the cross-sectional area of the lower cooling zone 13 without any allowance for the obstructions in the lower cooling zone.

The intake of the blower 40 communicates through a duct 41 with a conditioning chamber or zone 42 in which the cooling air is brought to the desired dry bulb temperature and relative humidity. In the conditioning chamber 42 is a heater 43 through which the cooling air flows. For example, the heater 43 may be a steam radiator supplied with steam through a pipe 44 having a control valve 45 therein on a control panel indicated generally by the numeral 46. Also disposed in the conditioning chamber 42 is a humidifying means which is exemplified as a spraying means 50 for spraying water into the stream of cooling air upstream from the heater 43 as the stream of cooling air flows through the conditioning chamber 42. The spraying means 50 is supplied with water through a pipe 51 having a control valve 52 therein on the control panel 46. It will be understood that the water delivered to the spraying means 50 may be obtained from any suitable source. For example, fresh water may be continuously supplied to the spraying means 50 through the water pipe 51, or, at least part of the water supplied to the spraying means may be obtained from a sump 53 below the spraying means, such sump serving to collect the water which is not taken up by the cooling air stream. If desired, the proportions of the water taken from the sump 53 and fresh water taken from an outside source may be controlled in any suitable manner, not shown, to provide the desired water temperature, the proportion of fresh water used being increased as the water temperature in the sump increases and vice versa. Also, in the event that extremely cold water is employed, or in the event that the cooling air entering the conditioning chamber is rather cold, steam may be added to the cooling water to increase its temperature and/or to assist in heating the cooling air. For this purpose, a steam pipe 54 is connected to the water pipe 51 and is controlled by a steam valve 55 on the control panel 46. As will be apparent, by suitable manipulation of the water and steam valves 52 and 55, the temperature of the spray water may be increased to any desired value, depending upon conditions.

The stream of cooling air delivered to the conditioning chamber 42 originates in a mixing chamber or zone 60 which has a fresh air intake 61 and a recirculating intake 62. The former communicates with an outside source, such as the interior or exterior of a building in which the installation is located, and the latter communicates with the outlet 18 of the cooling chamber 10. The outlet 18 also communicates with an exhaust passage 63 in which the exhaust fan 20 is disposed. Thus, with this arrangement, the stream of cooling air delivered to the conditioning chamber 42 from the mixing chamber 60 may include fresh air and recirculated air in various proportions, a proportioning valve means 64 associated with the fresh air intake 61, the recirculating intake 62 and the exhaust passage 63 being provided to control the proportions. As will be discussed in more detail hereinafter, the proportioning valve means 64 permits mixing recirculated air and fresh air in the mixing chamber 60 in any desired proportions, ranging from 0 to 100% of either. In other words, the proportioning valve means 64 permits operating the cooling system as a closed system, an open system, or as a partially closed system.

The principal advantage of this arrangement is that it permits operating the system as a closed system, or a substantially closed system, at night or at any other time when the outside air temperature is low, or when the installation is first put into operation and is warming up. In this way, excessive heating of the cooling air to bring it up to the desired temperature is eliminated, which is an important feature since it permits more economical operation of the installation. Also, this feature permits a faster warmup of the installation, particularly during cold weather operation.

Considering the proportioning valve means 64 in detail, it includes intake shutter means 67 and 68 in the intakes 61 and 62, respectively, and exhaust shutter means 69 in the exhaust passage 63, each shutter means including a plurality of pivoted shutter elements which are interconnected to operate in unison. The three shutter means 67, 68 and 69 are so interconnected that when the intake shutter means 67 in the fresh air intake 61 is fully open, the intake shutter means 68 in the recirculating intake 62 is fully closed and the exhaust shutter means 69 in the exhaust passage 63 is fully open. Under such conditions, only fresh air is delivered to the mixing chamber 60, all of the air exhausted through the outlet 18 being discharged through the exhaust passage 63 by the exhaust fan 20. Conversely, the three shutter means are so interconnected that when the intake shutter means 67 in the fresh air intake 61 is fully closed, the intake shutter means 68 in the recirculating intake 62 is fully open and the exhaust shutter means in the exhaust passage 63 is fully closed. Under such conditions, no fresh air is admitted to the mixing chamber 60, the system operating as a closed system under these conditions. For intermediate positions of the three shutter means, fresh air and recirculated air are mixed in variable proportions depending upon the positions of the shutter means.

In the particular construction illustrated, the foregoing operative relation between the three shutter means 67, 68 and 69 is obtained by connecting a sprocket 71 which drives the intake shutter means 68 to a sprocket 72 which drives the exhaust shutter means 69 through a chain 73 trained around such sprockets. Similarly, a sprocket, not visible in the drawing, rigidly connected to the sprocket 71 is connected by a chain 74 to a sprocket 75 which drives the intake shutter means 67. Thus, whenever the position of the intake shutter means 68 is changed, the positions of the shutter means 67 and 69 are changed correspondingly in the relation discussed above.

The control panel 46 is provided with a control 76 for the shutter means 67, 68 and 69, the control 76 being shown as connected to the sprocket 71 associated with the shutter means 68 by a diagrammatic connection 77. For example, a synchro system may be used, the control 76 operating a master synchro, not shown, which, in turn, controls a slave synchro connected to the sprocket 71. Alternatively, any other suitable connection between the control 76 and the shutter means may be employed.

In the illustrative control system shown for the apparatus, a dry bulb temperature pickup 78 is disposed in the inlet 15 and is connected to a dry bulb temperature indicator 79 on the control panel 46. Similarly, a wet bulb temperature pickup 80 is disposed in the inlet and is connected to a wet bulb temperature indicator 81 on the control panel. As will be apparent, the dry bulb temperature of the cooling air introduced into the lower cooling zone 13 and the relative humidity thereof can be obtained from the indicators 79 and 81, together with a psychrometric chart. Alternatively, a relative humidity indicator, not shown, may be employed to indicate the relative humidity directly.

Considering the over-all operation of the illustrative apparatus disclosed for performing the method of the invention, it will be assumed that the blower 40 is delivering the volume of air required to provide the desired velocity through the lower cooling zone 13. Preferably, the blower is provided with a variable drive means, not shown, to permit operating the system at various air velocities through the lower cooling zone. With the air velocity through the lower cooling zone 13 at the desired value, the relative humidity and dry bulb temperature of the cooling air delivered thereto may be regulated readily by means of the steam valve 45 through which steam is supplied to the heater 43, the water valve 52 through which water is supplied to the spraying means 50, the steam valve 55 through which steam is supplied to the spraying means 50 and the control 76 for the shutter means 67, 68 and 69. Any deviation in the indicated dry bulb temperature and relative humidity from the desired values may be corrected by manipulating one or more of these controls as required.

When the installation is first being put into operation, and particularly when the outside air temperature is low, or when the installation is in operation with a low outside air temperature, it is desirable to recirculate some or all of the cooling air so as to avoid excessive heating of the cooling air in the conditioning chamber 42 to bring it up to the desired dry bulb temperature. On the other hand, if the outside air temperature is high, and particularly if the outside air is dry as well, it is frequently desirable to operate with only fresh air entering the mixing chamber 60 through the fresh air intake 61, such hot, dry air readily being cooled to the desired temperature and humidified to the desired extent by the spraying means 50. As will be understood, when the system is operated as a closed system, the exhaust fans 19 and 20, and particularly the former, are preferably shut down.

It will be understood that while I have disclosed an apparatus wherein the dry bulb temperature, relative humidity and velocity of the cooling air are maintained at the desired values completely manually, the variables may be controlled in other ways. For example, the relative humidity and dry bulb temperature may be controlled by devices, not shown, responsive to dry bulb temperature and relative humidity. Thus, although I have disclosed an exemplary embodiment of an apparatus of the invention which is capable of performing the method of the invention, it will be understood that various changes, modifications and substitutions may be incorporated therein without necessarily departing from the spirit of the invention.

I claim as my invention:

1. A method of cooling loaves of bread in a cooling zone to a desired specific internal temperature in the range between 90° F. and 110° F. after baking, including the steps of: moving cooling air in a stream through said cooling zone at a velocity of the order of magnitude of 250 feet per minute; maintaining the dry bulb temperature of the cooling air upstream from the cooling zone between approximately 5° F. and 10° F. below said desired specific internal temperature; and maintaining the relative humidity of the cooling air upstream from the cooling zone at about 85% to 90%.

2. A method of cooling loaves of bread to a desired specific internal temperature in the range between 90° F. and 110° F., including the steps of: moving air along a path which includes a conditioning zone and a cooling zone with a velocity through said cooling zone between 250 feet per minute and 500 feet per minute, said cooling zone being adapted to receive the loaves of bread to be cooled; adding water and heat to said air in said conditioning zone; and controlling the amounts of water and heat added to said air in said conditioning zone to maintain the dry bulb temperature of the air moving from said conditioning zone to said cooling zone between about 5° F. and 10° F. less than said desired specific internal temperature, and to maintain the relative humidity thereof above about 85% to 90%.

References Cited in the file of this patent

UNITED STATES PATENTS

| | | |
|---|---|---|
| 1,753,828 | Greer | Apr. 8, 1930 |
| 1,798,781 | Brooks | Mar. 31, 1931 |
| 1,885,142 | Reece et al. | Nov. 1, 1932 |
| 2,008,407 | Stoever | July 16, 1935 |
| 2,073,221 | Reece et al. | Mar. 9, 1937 |
| 2,101,651 | Reece | Dec. 7, 1937 |
| 2,192,348 | James | Mar. 5, 1940 |
| 2,215,193 | Reece | Sept. 17, 1940 |
| 2,257,487 | Tenny | Sept. 30, 1941 |
| 2,275,588 | Greene | Mar. 10, 1942 |
| 2,277,382 | Botz | Mar. 24, 1942 |
| 2,501,898 | Haggerty | Mar. 28, 1950 |
| 2,643,523 | Burgess | June 30, 1953 |

OTHER REFERENCES

Freihofer Baking Co., by E. C. Pfaffhausen, Heating and Ventilating, January 1942, pages 55 to 57.